US012396605B2

(12) United States Patent
Valentini

(10) Patent No.: US 12,396,605 B2
(45) Date of Patent: Aug. 26, 2025

(54) PNEUMATIC TUBE OR HOSE FOR RELEASABLE AIRTIGHT CONNECTION TO A PNEUMATIC PORT AND RESPECTIVE PNEUMATIC PORT

(71) Applicant: Guido Valentini, Milan (IT)

(72) Inventor: Guido Valentini, Milan (IT)

(73) Assignee: Guido Valentini, Milan (IT)

( * ) Notice: Subject to any disclaimer, the term of this patent is extended or adjusted under 35 U.S.C. 154(b) by 0 days.

(21) Appl. No.: 17/242,590

(22) Filed: Apr. 28, 2021

(65) Prior Publication Data

US 2021/0378469 A1     Dec. 9, 2021

(30) Foreign Application Priority Data

Jun. 8, 2020    (EP) .................................. 20 178 759

(51) Int. Cl.
*A47L 9/24*     (2006.01)
*A47L 7/00*     (2006.01)
(Continued)

(52) U.S. Cl.
CPC ............. *A47L 9/242* (2013.01); *A47L 7/0095* (2013.01); *A47L 9/1409* (2013.01); *A47L 9/248* (2013.01); *B08B 15/04* (2013.01); *F16L 37/004* (2013.01)

(58) Field of Classification Search
CPC .......... A47L 7/0095; A47L 9/24; A47L 9/242; A47L 9/244; A47L 9/248; A47L 9/1409;
(Continued)

(56) References Cited

U.S. PATENT DOCUMENTS 4,049,295 A * 9/1977 Piers ...................... F16L 37/004
285/332
2003/0188397 A1   10/2003 Syverson et al.
(Continued)

FOREIGN PATENT DOCUMENTS

CN          1672622 A     12/2007
CN        101301181 A     10/2010
(Continued)

OTHER PUBLICATIONS

Schuele, M., Original Document of DE 102012216884A1, Mar. 20, 2014, p. 1-19 (Year: 2014).*
(Continued)

*Primary Examiner* — Brian D Keller
*Assistant Examiner* — Sidney D Full
(74) *Attorney, Agent, or Firm* — William J. Barber; WARE FRESSOLA MAGUIRE & BARBER LLP

(57) ABSTRACT

A pneumatic tube or hose having a longitudinal axis along its longitudinal extension and two ends, each provided with a respective socket adapted for a releasable airtight connection to a first pneumatic port of a vacuum generation unit or a second pneumatic port of a vacuum utilization device. The socket includes a magnetic element adapted for interaction with a corresponding magnetic element provided in the vacuum generation unit and/or in the vacuum utilization device in order to secure the socket to the first or second pneumatic port by means of a magnetic force. The socket has an end surface facing the first or second pneumatic port when the socket is secured to the first or second pneumatic port, the end surface having a ramp shape continuously rising from a starting region along its circumference to an end region.

14 Claims, 7 Drawing Sheets

(51) Int. Cl.
    *A47L 9/14*     (2006.01)
    *B08B 15/04*     (2006.01)
    *F16L 37/00*     (2006.01)

(58) Field of Classification Search
    CPC ....... B24B 55/06; B24B 55/10; B24B 55/102; B24B 55/105; B24B 55/107; F16L 37/004
    USPC .......................................................... 285/9.1
    See application file for complete search history.

(56) References Cited

U.S. PATENT DOCUMENTS

| | | | | |
|---|---|---|---|---|
| 2004/0231096 | A1* | 11/2004 | Battle | A47L 9/244 15/323 |
| 2011/0084474 | A1* | 4/2011 | Paden | F16L 37/004 285/9.1 |
| 2016/0355972 | A1* | 12/2016 | Goble | A47L 9/2857 |
| 2019/0257453 | A1* | 8/2019 | Leidefeldt | F17C 13/005 |
| 2020/0060484 | A1 | 2/2020 | Conrad | |
| 2021/0307579 | A1* | 10/2021 | Lee | F16L 37/004 |

FOREIGN PATENT DOCUMENTS

| | | | | |
|---|---|---|---|---|
| CN | 102862104 A | | 1/2013 | |
| CN | 105091265 A | | 11/2015 | |
| CN | 107553294 A | | 1/2018 | |
| CN | 107334423 A | | 12/2022 | |
| DE | 102012216884 A1 | * | 3/2014 | ........... A47L 7/0095 |
| KR | 2002773070000 | * | 6/2002 | ............. F16L 25/00 |
| KR | 20070069076 A | * | 7/2007 | ............ A01D 34/10 |
| WO | 2018/143635 A1 | | 8/2018 | |

OTHER PUBLICATIONS

Schuele, M., PE2E Translation of DE102012216884A1, Mar. 20, 2014, p. 1-12 (Year: 2014).*
KR2002773070000 WIPO Translation; Magnetic Connector of Decompression Hose Connection Tube; Jun. 3, 2002 (Year: 2002).*
KR-20070069076-A PE2E Translation; Magnetically Connected Coupling Assembly; Daly, Shawn; Jul. 2, 2007 (Year: 2007).*
English language translation of CN102862104A.
English language translation of CN107334423A.
English language translation of CN1672622A.
English language translation of CN105091265A.
English language translation of CN107553294A.
English language translation of CN101301181A.

* cited by examiner

PNEUMATIC TUBE OR HOSE FOR RELEASABLE AIRTIGHT CONNECTION TO A PNEUMATIC PORT AND RESPECTIVE PNEUMATIC PORT

BACKGROUND OF THE INVENTION

1. Field of Invention

The present invention refers to a pneumatic tube or hose having a longitudinal axis along a longitudinal extension of the pneumatic tube or hose and having two ends, each provided with a socket adapted for releasable airtight connection to a pneumatic port of a vacuum generation unit and/or to a pneumatic port of a vacuum utilization device, respectively.

Further, the invention refers to a pneumatic port of a vacuum generation unit or of a vacuum utilization device. The pneumatic port is adapted for releasable airtight connection to a socket provided at one end of a pneumatic tube or hose having a longitudinal axis along a longitudinal extension of the pneumatic tube or hose.

2. Description of Related Art

Various types of vacuum generation units are known in the art, which can be connected to various types of vacuum utilization devices by means of a pneumatic tube or hose. The pneumatic tube or hose is preferably releasably connected to the vacuum generation units and the vacuum utilization devices. In particular, it is known that the pneumatic tube or hose has sockets at its ends which are adapted to interact with respective pneumatic ports at the vacuum generation units and the vacuum utilization devices for releasable connection. In the state of the art, the sockets of a pneumatic tube or hose are mechanically connected (attached and secured) to the respective pneumatic ports of the vacuum generation units and the vacuum utilization devices, for example by means of frictional force, a snap-lock connection or a bayonet joint between the sockets and the respective pneumatic ports.

Vacuum generation units in the form of dust extraction systems, in particular mobile or stationary vacuum cleaners, are well known in the art. Dust extraction systems usually comprise a vacuum generation device, a dust collecting container, a pneumatic port embodied as an air inlet port for dust laden air, located downstream of the vacuum generation device and connecting the inside of the dust collecting container with the environment, an air outlet port for filtered air located upstream of the vacuum generation device and connecting an exhaust opening of the vacuum generation device with the environment, a filter element located between the dust collecting container and a suction opening of the vacuum generation device, and a pneumatic tube or hose with the socket.

The air inlet port can be connected to an air outlet port of a vacuum utilization device, for example in the form of a hand-guided power tool, by means of a pneumatic tube or hose. The dust extraction system actively draws dust-laden air, which is generated during intended use of the power tool, through the pneumatic tube or hose into the dust collecting container. The dust-laden air is filtered by the filter element and the filtered air is subsequently discarded into the environment through the air outlet port of the dust extraction system.

A disadvantage of the known pneumatic tubes or hoses and of the respective vacuum generation units and vacuum utilization devices is the purely mechanical connection of the sockets of the pneumatic tubes or hoses to the respective pneumatic ports of the vacuum generation units and the vacuum utilization devices. Establishing the connection mechanically may be cumbersome and time consuming and the connection itself may by unreliable and difficult to undo and disconnect.

SUMMARY OF THE INVENTION

Therefore, it is an object of the present invention to improve pneumatic connections between sockets of pneumatic tubes or hoses and respective pneumatic ports of vacuum generation units and vacuum utilization devices, respectively.

This object is solved by the pneumatic tube or hose with the features as follows: In particular, starting from the pneumatic tube or hose of the above identified kind, it is suggested that at least one of the sockets of the pneumatic tube or hose comprises at least one magnetic element adapted for interaction with at least one respective magnetic element provided in a vacuum generation unit and/or in a vacuum utilization device in order to secure the socket of the pneumatic tube or hose to the pneumatic port of the vacuum generation unit or of the vacuum utilization device by means of magnetic force.

According to the invention, the pneumatic tube or hose, in particular a socket of the pneumatic tube or hose, is attached to the pneumatic port of a vacuum generation unit and/or of a vacuum utilization device, in particular to a pneumatic port of the unit or device, in any possible way (in particular magnetically or mechanically, e.g. by means of mechanical guiding means) and then secured thereto by means of magnetic force. This allows for a fast and easy connection of the pneumatic tube or hose to the vacuum generation unit and/or the vacuum utilization device. The connection is secured in a reliable manner and when desired easy to undo and disconnect.

The pneumatic port of the vacuum generation unit or of the vacuum utilization device may comprise a guiding section, preferably in the form of a hollow cylinder, adapted for receiving the socket of the pneumatic tube or hose. The socket is inserted into the guiding section, which during insertion of the socket guides it into its secured position in respect to the pneumatic port, in which the socket is secured to the pneumatic port by means of magnetic force. Alternatively, the socket of the pneumatic tube or hose may comprise a guiding section, preferably in the form of a hollow cylinder, adapted for receiving the pneumatic port of the vacuum generation unit or of the vacuum utilization device. The guiding section of the socket is pushed over the pneumatic port and moved thereon in respect to the pneumatic port towards the secured position of the socket, in which the socket is secured to the pneumatic port by means of magnetic force.

According to a preferred embodiment of the present invention, it is suggested that the at least one magnetic element of the at least one socket of the pneumatic tube or hose comprises one or more permanent magnets and/or one or more ferromagnetic elements. A permanent magnet is an object made from a material that is magnetized and creates its own persistent magnetic field. A ferromagnetic element is made from a material including, for example, the elements iron, nickel and cobalt and their alloys, some alloys of rare-earth metals, and some naturally occurring minerals such as lodestone. In order to provide for a safe securing of the socket of the pneumatic tube or hose to the pneumatic port, the socket of the pneumatic tube or hose preferably comprises more than one permanent magnet and/or more than one ferromagnetic element. A permanent magnet with a given polarity can interact with a respective permanent magnet of an opposite polarity or with a ferromagnetic element, which would be provided at the vacuum generation unit and/or the vacuum utilization device, preferably at the respective pneumatic port of the vacuum generation unit and/or the vacuum utilization device, to which the socket is attached and magnetically secured to.

For example, the pneumatic port of the vacuum generation unit or of the vacuum utilization device may comprise a guiding section, preferably in the form of a hollow cylinder, adapted for receiving the socket of the pneumatic tube or hose. The socket is inserted into the guiding section, which during insertion of the socket guides it into its secured position in respect to the pneumatic port, in which the socket is secured to the pneumatic port by means of magnetic force. Likewise, the socket of the pneumatic tube or hose may comprise a guiding section, preferably in the form of a hollow cylinder, adapted for receiving the pneumatic port of the vacuum generation unit or of the vacuum utilization device. The guiding section of the socket is positioned close to and then pushed over tube-like protruding part of the pneumatic port and moved thereon in respect to the pneumatic port towards the secured position of the socket, in which the socket is secured to the pneumatic port by means of magnetic force.

Depending on the location and orientation of the magnetic elements at the socket and at the respective pneumatic port, to which the socket is attached and magnetically secured to, the resulting magnetic force may be directed in different directions. According to a preferred embodiment, the magnetic force acts in an axial direction extending essentially parallel to the longitudinal axis of the pneumatic tube or hose. In this embodiment, the at least one magnetic element may be provided at a surface of the socket facing a vacuum generation unit or a vacuum utilization device when the socket is secured to the pneumatic port. Preferably, the surface comprising the at least one magnetic element is an end surface of the socket. The at least one magnetic element may have the form of a circular arc. Several magnetic elements may form an entire circle. Several magnetic elements may be provided on the same or on separate surfaces of the socket facing a vacuum generation unit or a vacuum utilization device when the socket is secured to the pneumatic port. Corresponding magnetic elements are provided at corresponding positions at the vacuum generation unit or the vacuum utilization device, preferably around or at the pneumatic port of the vacuum generation unit or the vacuum utilization device. The socket of the pneumatic tube or hose may be inserted into or pushed over the pneumatic port of the vacuum generation unit or the vacuum utilization device in an axial direction. The inserting or pushing motion is continued until the socket is in its secured position and secured in respect to the pneumatic port by means of magnetic force. The magnetic force may support the inserting or pushing motion of the socket in respect to the pneumatic port at least at the end of the motion. Hence, in this embodiment, the direction of the inserting or pushing motion of the socket in respect to the pneumatic port is parallel to the resulting magnetic force between the magnetic elements. In order to release the connection between the socket and the pneumatic port a force is applied to the socket, having at least a component directed in the opposite direction of the magnetic force, the component being directed essentially parallel to a longitudinal axis of the pneumatic tube or hose.

Alternatively, it is suggested that the magnetic force acts in a circumferential direction extending in a plane running essentially obliquely, preferably perpendicular, to the longitudinal axis of the pneumatic tube or hose, and around the longitudinal axis. In this embodiment, the socket of the pneumatic tube or hose may comprise a clamp-like element which may be clamped over the respective pneumatic port to which it is to be connected to. To this end, the clamp-like element has a section which may be spread apart. The spread-apart clamp-like element is put around the pneumatic port in an essentially radial direction in respect to the longitudinal axis of the pneumatic tube or hose. Then, the clamp-like element is pressed together again into its closed form, thereby enclosing or gripping behind respective protrusions provided on an external circumferential surface of the pneumatic port. Thereby, the socket is attached to the pneumatic port and cannot be moved in the axial direction. The clamp-like element is secured in its pressed-together closed form by means of magnetic force acting on the section of the clamp-like element in a circumferential direction. To this end, the section of the clamp-like element, which may be spread apart, is provided with respective magnetic elements which interact with each other creating a magnetic field and the resulting magnetic force acting in a circumferential direction, securing the clamp-like element in its closed form and, hence, securing the socket of the pneumatic tube or hose in respect to the pneumatic port.

According to yet another alternative embodiment of the invention, it is suggested that the magnetic force acts in a radial direction extending essentially perpendicular to the longitudinal axis of the pneumatic tube or hose. In this embodiment, the at least one magnetic element may be provided at a circumferential surface of the socket facing the pneumatic port of a vacuum generation unit or of a vacuum utilization device to which the socket is secured. If the socket is inserted into the pneumatic port, the magnetic elements are preferably provided on an external circumferential surface of the socket. If, however, the socket surrounds the pneumatic port the magnetic elements are preferably provided on an internal circumferential surface of the socket. Several magnetic elements may form an entire circle. Several magnetic elements may be provided on the same or on separate circumferential surfaces of the socket facing the pneumatic port to which the socket is secured. Corresponding magnetic elements are provided at corresponding positions around or at the pneumatic port of the vacuum generation unit or the vacuum utilization device. The socket of the pneumatic tube or hose may be inserted into or pushed over the pneumatic port of the vacuum generation unit or the vacuum utilization device in an axial direction. The inserting or pushing motion is continued until the socket is in its secured position and secured in respect to the pneumatic port by means of magnetic force. In this embodiment, the direction of the inserting or pushing motion of the socket in respect to the pneumatic port is obliquely, preferably perpendicular, to the resulting magnetic force between the magnetic elements. In order to release the connection between the socket and the pneumatic port a force is applied to the socket, having at least a component directed in a direction obliquely, preferably perpendicular, to the radial direction of the magnetic force.

According to a preferred embodiment of the present invention, it is suggested that the pneumatic tube or hose is connected to the vacuum generation unit and/or to the vacuum utilization device in a manner freely rotatable about the longitudinal axis of the pneumatic tube or hose. This embodiment has the advantage that the pneumatic tube or hose cannot twist or get tangled up due to a relative change of position and/or orientation of the vacuum utilization device (e.g. a hand-guided power tool) in respect to the vacuum generation unit (e.g. a dust extraction system). A change of relative position and/or orientation may occur during operation and intended use of the power tool, when complex working surfaces, for example a vehicle body, are worked. Furthermore, this has the advantage that a user operating the power tool can move more freely in respect to the dust extraction system and that the user's movement along the surface to be worked is not impaired or restricted by a stubborn and non-rotatable pneumatic tube or hose.

If the dust extraction system is embodied in the form of a mobile vacuum cleaner, the vacuum cleaner will follow the user moving along the working surface in an even and smooth motion. The mobile vacuum cleaner is directly or indirectly provided with wheels adapted for freely moving the vacuum cleaner on a two-dimensional area, in particular the floor. The wheels may be directly attached to a housing of the vacuum cleaner and/or they may be attached, for example, to a cart or a carriage, on which a (static or mobile) vacuum cleaner is located. The vacuum cleaner is preferably attached to the cart or carriage or simply held thereon automatically by means of its own weight.

The free rotation of the pneumatic tube or hose in respect to the vacuum generation unit and the vacuum utilization device is preferably realized in that the at least one socket of the pneumatic tube or hose comprising the at least one magnetic element is attached to an end of the pneumatic tube or hose by means of a rotary connection element providing for a free rotation of the pneumatic tube or hose in respect to the at least one socket about the longitudinal axis of the pneumatic tube or hose. Theoretically, it would be sufficient if the socket at one end of the pneumatic tube or hose is attached to the end of the pneumatic tube or hose by means of a rotary connection element. Preferably, the sockets at both ends of the pneumatic tube or hose are attached to the respective end of the pneumatic tube or hose by means of a rotary connection element. The rotary connection element provides for an airtight connection of the socket to the respective end of the pneumatic tube or hose. Preferably, the rotary connection element has an annular, circular shape, in order to allow free rotation of the pneumatic tube or hose in respect to the socket. The free rotation is independent of the cross sectional form of the socket and the pneumatic tube or hose and can be realized by means of the rotary connection element even if the socket and/or the pneumatic tube or hose do not have a circular cross sectional form. In particular, the socket and/or the pneumatic tube or hose could have an oval or any polygonal form. However, preferably, the socket and the pneumatic tube or hose have a circular cross sectional form. The rotary connection element may comprise a frictional bearing or a ball bearing for easier rotation.

The tube could be made of a rigid material, e.g. metal or a hard plastic material. The tube could be designed extractable like a telescope, in order to extend or reduce its length. The various extractable telescopic elements are preferably attached to each other in an airtight manner. The tube could be used, for example, for connecting various components of a dust extraction system (e.g. a vacuum generation unit, a container with a dust filter element, a dust collecting container, a vacuum utilization device) with each other.

Alternatively, the tube made of rigid material could also be embodied as an adapter having a generally smaller length than the above described tubes. The form of the tube is not limited to a straight extension with two sockets at opposing ends of the tube or hose. Rather, the tube or hose could also have a Y-shape with three sockets at the respective ends of the Y-shape. Such a Y-shaped tube or hose could be used as an adapter which with one socket is attached to a vacuum generation unit and with the two other sockets attached to a separate vacuum utilization device each. The two other sockets for attachment to the vacuum utilization devices could be provided with a removable, preferably air-tight lid for closing an opening of the sockets when no vacuum utilization device is attached thereto. Alternatively, the Y-shaped tube or hose could be used to operate a single vacuum utilization device with two separate vacuum generation units.

Preferably, the hose is made of a flexible material (e.g. rubber, fabric and/or soft plastic material) or has a (e.g. multi-segmented or foldable like a concertina) construction in order to achieve flexibility of the hose. The flexibility of the suction hose allows bending of the suction hose transversely to its longitudinal extension and, preferably, at the same time prevents kinking of the hose. The flexible suction hose may be realized, for example, by means of an airtight textile or metal fabric hose. The airtightness may be realized, for example, by means of an airtight coat or insert at the inside of the suction hose. The coat or insert may be made, for example, from rubber or a flexible and/or elastic plastic material, e.g. an elastomer, in particular a thermoplastic elastomer. Alternatively, the flexible suction hose may be realized, for example, from a plastic material, e.g. hard and/or soft PVC (polyvinyl chloride) or PU (polyurethane). The suction hose may comprise external spiral shaped reinforcement windings for giving the suction hose a treadable and kink proof characteristic while maintaining its flexibility. Furthermore, the flexible suction hose could also be made of metal annular segments attached to each other along the longitudinal extension of the hose in a movable manner in order to realize flexibility of the suction hose. Preferably, the metal annular segments are attached to each other in an airtight manner. Alternatively, the suction hose made of metal annular segments is provided with an airtight coat or insert at the inside of the hose.

According to a preferred embodiment of the present invention, it is suggested that the at least one socket of the pneumatic tube or hose comprising the at least one magnetic element has an end surface facing a pneumatic port of a vacuum generation unit or of a vacuum utilization device when the socket is secured to the pneumatic port, the end surface having a ramp shape continuously rising from a starting region of the end surface along its circumference to an end region of the end surface. An imaginary plane extending perpendicular in respect to the longitudinal axis of the pneumatic tube or hose is defined. The end surface of a conventional socket of a pneumatic tube or hose will extend in this plane. In contrast thereto, the end surface of the socket of the pneumatic tube or hose according to this embodiment, only the starting region or the end region is located in the plane while the rest of the end surface continuously moves away from the plane and has its largest distance to the plane at its end region (with the starting region extending in the plane) or its starting region (with the end region extending in the plane), respectively. In one embodiment, the ramp shaped end surface extends along the entire circumference of 360°. In other embodiments the end surface of the socket of the pneumatic tube or hose comprising the at least one magnetic element may have more than one ramp-shaped region each of which continuously rising from a starting region of the end surface along its circumference to an end region of the end surface. In this case, each of the ramp-shaped regions of the end surface extends, for example, along a circumference of 180° (two ramp-shaped regions), 120° (three ramp-shaped regions), 90° (four ramp-shaped regions) and so on.

An end surface of the pneumatic port of a vacuum generation unit or of a vacuum utilization device has a corresponding design with a ramp shape continuously rising from a starting region of the end surface along its circumference to an end region of the end surface. In the magnetically secured position of the socket in respect to the pneumatic port, the two mating end surfaces of the socket and the pneumatic port preferably seat on each other on the entire end surfaces. By rotating the socket about the longitudinal axis of the pneumatic tube or hose in respect to the pneumatic port, the mating end surfaces slide on each other thereby moving apart the respective magnetic elements provided at the socket and the pneumatic port. Due to the increasing distance of the respective magnetic elements the magnetic force interacting between them decreases, thereby facilitating release of the connection between the socket and the pneumatic port. By rotating the socket about the longitudinal axis of the pneumatic tube or hose in respect to the pneumatic port, the force in the opposite direction of the magnetic force, which has to be applied to the socket in order to release the connection is significantly reduced. When attaching the socket to the pneumatic port, a relative rotation of the socket in respect to the pneumatic port in the opposite direction is applied. Alternatively, other mechanical means acting between the socket and the pneumatic element, e.g. a lever mechanism or the like, may be applied in order to initially distance the magnetic elements of the socket from the magnetic elements of the pneumatic port and to facilitate release of the connection between the socket and the pneumatic port.

It is suggested that the pneumatic tube or hose is adapted for releasable airtight connection to a pneumatic port of a vacuum generation unit embodied as a dust extraction system, in particular a mobile vacuum cleaner, and/or to a pneumatic port of a vacuum utilization device embodied as a hand-guided power tool, in particular a sanding machine or a polishing machine, respectively. The present invention has the above mentioned advantages in particular in connection with these units and devices, respectively. The magnetic securing of the socket to the pneumatic port can be achieved even if dust and/or small particles, which are often present in an environment where dust-generating power tools are used, are trapped between the socket and the pneumatic port. In contrast thereto, a mechanical connection of a socket to a pneumatic port may be severely impaired or even impossible, if dust or small particles are trapped between the socket and the pneumatic port. Of course, the vacuum generation unit is not limited to a vacuum cleaner but could be embodied as any kind of air suction source.

The above-identified object is also solved by a pneumatic port of a vacuum generation unit or of a vacuum utilization device comprising the features of claim 11. In particular, starting from the pneumatic port of the above identified kind, it is suggested that the pneumatic port comprises at least one magnetic element for interaction with at least one respective magnetic element provided at an end of the pneumatic tube or hose, in particular at the socket of the pneumatic tube or hose, in order to secure the socket of the pneumatic tube or hose to the pneumatic port by means of magnetic force. The at least one magnetic element does not necessarily have to form a part of the pneumatic port and does not have to be directly attached thereto, but could also be located at or in the vacuum generation unit or the vacuum utilization device, in particular in a housing of the unit or the device, near or around the pneumatic port.

The socket of the pneumatic tube or hose and the pneumatic port of the vacuum generation unit or of the vacuum utilization device constitute some kind of pneumatic plug and corresponding socket, which are secured to each other by means of magnetic force, in order to avoid unintentional separation and detachment of the plug and socket.

Similar to what was previously described in respect to the socket of the pneumatic tube or hose, the at least one magnetic element of the pneumatic port may comprise one or more permanent magnets and/or one or more ferromagnetic elements. The type, position, size and number of magnetic elements of the pneumatic port depend on the type, position, size and number of magnetic elements of the socket of the pneumatic tube or hose. Hence, the type, position, size and number of magnetic elements of the pneumatic port and of the socket are harmonized to one another, in order to achieve the desired securing effect between the socket and the pneumatic port. On the one hand, the securing effect must be strong enough in order to assure a proper intended use of the vacuum generation unit and/or the vacuum utilization device. On the other hand, the securing effect must not be too strong, in order to allow the user to overcome the magnetic securing effect in order to separate the socket from the pneumatic port and to detach the pneumatic tube or hose from the vacuum generation unit and the vacuum utilization device, respectively. The use of mechanical means for facilitating manual separation of the socket from the pneumatic port may allow a stronger securing effect while still enabling the user to separate the socket from the pneumatic port with the help of the mechanical means.

Similar to what was previously described in respect to the socket of the pneumatic tube or hose, the pneumatic port comprising the at least one magnetic element may have an end surface facing a socket of a pneumatic tube or hose when the socket is secured to the pneumatic port, the end surface having a ramp shape continuously rising from a starting region of the end surface along its circumference to an end region of the end surface. In co-operation with the respective ramp-shaped end surface of the socket, the ramp-shaped end surface of the pneumatic port allows an easier separation and detachment of the socket from the pneumatic port, simply by rotating the socket in respect to the pneumatic port around the longitudinal axis of the pneumatic tube or hose.

In particular, it is suggested that
  the pneumatic port is part of a vacuum generation unit, in particular a dust extraction system, comprising
  a vacuum generation device,
  a dust collecting container,
  the pneumatic port embodied as an air inlet port for dust laden air, located downstream of the vacuum generation device and connecting the inside of the dust collecting container with the environment,
  an air outlet port for filtered air located upstream of the vacuum generation device and connecting an exhaust opening of the vacuum generation device with the environment, a filter element located between the dust collecting container and a suction opening of the vacuum generation device, and the pneumatic tube or hose with the socket and the at least one magnetic element, the socket adapted for releasable connection to the air inlet port by means of magnetic force.

Alternatively, it is suggested that the pneumatic port is part of a hand-guided power tool, in particular a sanding machine or a polishing machine, comprising a working element, in particular with a sanding or polishing member, wherein the power tool is adapted for working a working surface with the working element during the intended use of the power tool, and the power tool creates dust during its intended use, and the pneumatic port embodied as an air outlet socket adapted for releasable connection to the socket with the at least one magnetic element and provided at an end of the pneumatic tube or hose by means of magnetic force.

The power tool could be operated electrically comprising an electric motor or pneumatically comprising a pneumatic motor actuated by means of compressed air.

Further features and advantages of the present invention will be described in further detail hereinafter with reference to the accompanying drawings. Each of the features of the present invention shown in the drawings and/or described hereinafter, is considered important for the present invention not only in the shown/described embodiment, but also on its own (without the other features of the respective embodiment) and/or in combination with any another embodiment even if not explicitly shown in the drawings and/or described in the specification. The drawings show:

BRIEF DESCRIPTION OF THE DRAWING

The drawing includes FIGS. 1-13, as follows.

DETAILED DESCRIPTION OF THE BEST MODE OF THE INVENTION

Figure 1:
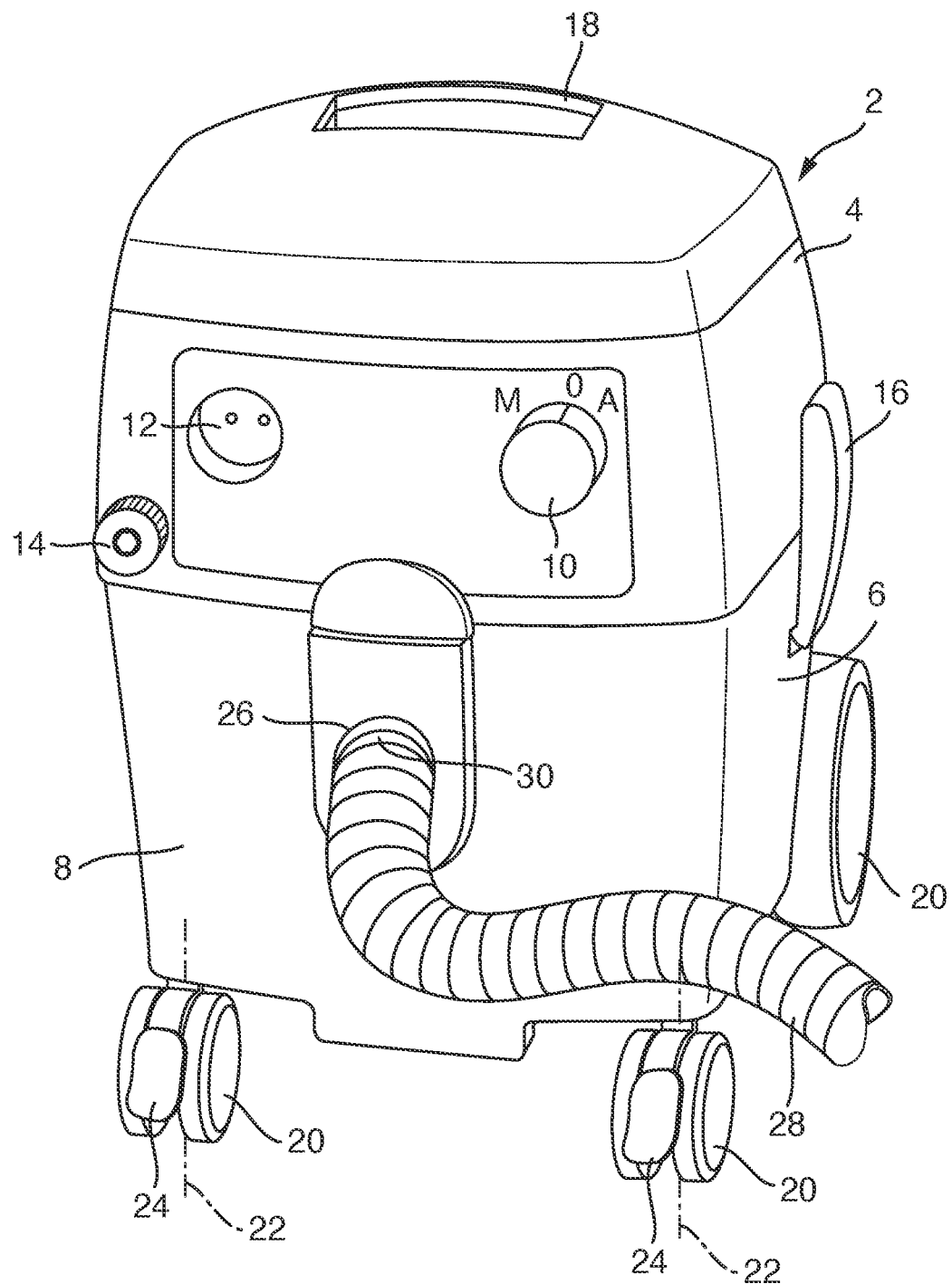
FIG. 1 a vacuum generation unit embodied as a dust extraction system, in particular a mobile vacuum cleaner, according to a preferred embodiment.

FIG. 1 shows an example of a vacuum generation unit embodied as a dust extraction system, in particular a mobile vacuum cleaner 2. The vacuum cleaner 2 comprises an essentially two-part casing with an upper part 4 and a lower part 6. The lower part 6 of the casing comprises a dust collecting container 8 for receiving and storing dust and other small particles which have been filtered out of a dust-laden air aspired by the vacuum cleaner 2. The upper part 4 of the casing comprises among others at least one electric motor and at least one turbine for creating a low pressure or vacuum (i.e. a pressure below the ambient pressure) in the container 8 and for provoking aspiration of dust-laden air. Furthermore, the upper part 4 of the casing comprises one or more air filter elements for filtering dust and small particles out of the aspired dust laden air. On the outside of the upper part 4 of the casing, a user interface 10 is provided for the operational control of the vacuum cleaner 2 and its motor(s). The user interface 10 comprises in particular a control switch adapted for turning on ("A" or "M") and off ("0") the vacuum cleaner 2, for switching between automatic ("A") and manual ("M") operational mode and/or possibly also for manual speed control of the motor(s). The vacuum cleaner 2 and its motor(s) is operated by means of electric power from a mains power supply and/or from one or more batteries, which are preferably rechargeable. The one or more batteries may be internal batteries fixedly attached and electrically connected inside the casing 4, 6 of the vacuum cleaner 2 and/or extractable batteries removably inserted from outside the vacuum cleaner 2 into the casing 4, 6 and electrically connected therein.

Figure 2:
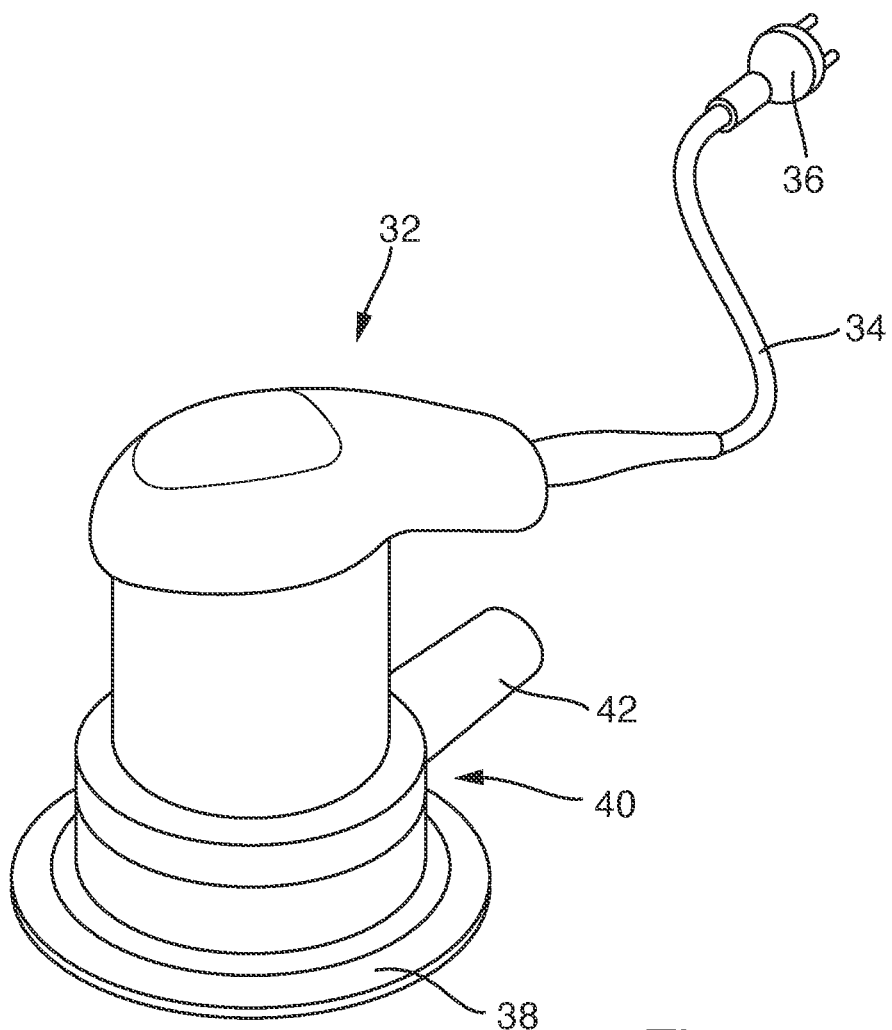
FIG. 2 a vacuum utilization device embodied as a hand-guided power tool, in particular a sanding machine, according to a preferred embodiment.

The upper part 4 of the casing may have a power socket 12 for receiving an electric plug of a power supply line of an electric hand-guided power tool (see FIG. 2). The power socket 12 is preferably in connection with the electric power supply for operating the vacuum cleaner 2 and its motor(s). The power tool draws its electric current for operation of its electric motor from the socket 12. The vacuum cleaner 2 has means for sensing when the power tool draws current from the socket 12 and for automatically turning on the vacuum cleaner 2 and its motor, respectively, when current is drawn, and turning off the vacuum cleaner 2 and its motor, respectively, possibly after a delay, when no current is drawn.

The upper part 4 of the casing may also have an air socket 14 for connecting a pneumatic tube of a pneumatic hand-guided power tool to the vacuum cleaner 2. The air socket 14 is preferably in connection with an external compressed air supply and provides compressed air for operating the power tool and its pneumatic motor(s). The power tool draws compressed air for operation of its pneumatic motor from the air socket 14. The vacuum cleaner 2 has means for sensing when the power tool draws compressed air from the socket 14 and for automatically turning on the vacuum cleaner 2 and its motor, respectively, when compressed air is drawn, and turning off the vacuum cleaner 2 and its motor, respectively, possibly after a delay, when no compressed air is drawn.

The upper part 4 of the casing is releasably attached to the bottom part 6 by means of latches 16 located at opposite lateral sides of the casing 4, 6. The upper part 4 of the casing is provided with a handle 18 for conveniently carrying the vacuum cleaner 2 to its designated site of operation. The bottom part 6 of the casing is provided with wheels 20 so the vacuum cleaner 2 can be conveniently rolled over a base surface, in particular the floor, from one position to another. Preferably, the front wheels 20 are pivotable about an essentially vertical pivoting axis 22, in order to allow easy manoeuvring of the vacuum cleaner 2, and comprise licking brake means 24 for temporarily fixing the vacuum cleaner 2 in its current position. Hence, the vacuum cleaner 2 is a mobile unit which can be easily moved to a desired site of operation. Alternatively, the vacuum cleaner 2 (with or without wheels 20) could also be positioned on a cart or carriage provided with wheels and manoeuvred over a base surface. Of course, the present invention could also be applied to fixed or stationary dust extraction systems used in factories, garages, shipyards or the like.

The vacuum cleaner 2 comprises a vacuum generation device including the one or more motors and the one or more turbines, the dust collecting container 8, and a pneumatic port 26 embodied as an air inlet port for the dust laden air, located downstream of the vacuum generation device and connecting the inside of the dust collecting container 8 with the environment. Further, the vacuum cleaner 2 comprises an air outlet port (not shown but usually present in the upper casing 4) for filtered air located upstream of the vacuum generation device and connecting an exhaust opening of the vacuum generation device with the environment. The filter element is located between the dust collecting container 8 and a suction opening of the vacuum generation device. Furthermore, the vacuum cleaner 2 comprises a pneumatic tube or hose 28 with sockets 30 at its ends. One of the sockets 30 is adapted for releasable connection of the pneumatic tube or hose 28 to the air inlet port 26. It is suggested that the socket 30 of the pneumatic tube or hose 28 is attached to the pneumatic port 26 of the vacuum cleaner 2 and secured thereto by means of magnetic force, which will be described in further detail hereinafter. The opposite end of the pneumatic tube or hose 28 may be connected to a pneumatic port of any vacuum utilization device. The vacuum utilization device may be realized, for instance, as a suction nozzle, a floor nozzle, a suction brush, or a hand-guided power tool.

An example of a vacuum utilization device in the form of a hand-guided power tool 32, in particular a sanding machine (or sander), is shown in FIG. 2. The power tool 32 shown in FIG. 2 is an electric power tool comprising an electric motor and a power cable 34 with an electric plug 36 at its distal end. The plug 36 may be plugged into the electric socket 12 of the vacuum cleaner 2 (see FIG. 1) or in any other external power socket. Of course, the power tool 32 could also be embodied as a pneumatic power tool comprising a pneumatic motor and a compressed air tube or hose which may be plugged into the air socket 14 of the vacuum cleaner 2 (see FIG. 1) or in any other external compressed air socket.

The motor of the power tool 32 drives a working element 38, for example in the form of a backing pad, either directly or indirectly, for example through a gear mechanism. A sanding member may be releasably attached to a bottom surface of the backing pad 38. If the power tool 32 was embodied as a polishing machine, a polishing member could be releasably attached to the bottom surface of the backing pad 38. The power tool 32 is adapted for working a working surface with the working element 38 during the intended use of the power tool 32. The power tool 32 has a casing 40 containing the motor, possibly a gear mechanism, electric and electronic components and other internal components of the power tool 32. The working element 38 protrudes from the casing 40. Further, the power tool 32 comprises a pneumatic port 42 embodied as an air outlet port adapted for releasable connection to a socket 30 of a pneumatic tube or hose 28. It is suggested that the socket 30 of the pneumatic tube or hose 28 is attached to the pneumatic port 42 of the power tool 32 and secured thereto by means of magnetic force, which will be described in further detail hereinafter.

If the other end of the tube or hose 28 is connected to a vacuum generation unit, like for example the vacuum cleaner 2, dust-laden air from the working surface of the power tool 32 could be aspired into the dust collecting container 8 of the vacuum cleaner 2 through the pneumatic port 42 of the power tool 32, the pneumatic tube or hose 28 and the pneumatic port 26 of the vacuum cleaner 2. Preferably, the air inlet port 26 of the vacuum cleaner 2 is connected to the air outlet port 42 of the hand-guided power tool 32 by means of the pneumatic tube or hose 28. The vacuum cleaner 2 actively draws dust-laden air generated by the power tool 32 during its intended use through the pneumatic tube or hose 28 into the dust collecting container 8. The dust-laden air is filtered by the filter element, and the filtered air is subsequently discarded into the environment through the air outlet port of the vacuum cleaner 2.

For the sake of simplicity, no on/off—for turning the power tool 32 on or off and no rotational switches for speed regulation of the power tool 32 and its motor, respectively, are shown in FIG. 2. However, these and other details of the power tool 32 may be present, although not explicitly shown. Furthermore, the power tool 32 could also be embodied as a drill, a drill hammer, a planning machine, a milling machine, a chisel machine, or any other power tool which generates dust and small particles during its intended use. All these power tools could be provided with a pneumatic port according to the invention, like the pneumatic port 42 of the power tool 32. The socket 30 of a pneumatic tube or hose 28 or of a passive filter unit could be connected to the pneumatic port, in order to aspirate the dust-laden air and/or collect the dust and small particles, thereby removing them from the working surface and the surrounding air. The power tool 32 may be provided with switches for turning on/off and for controlling the speed of the power tool 32 and the tool's motor, respectively. The switches may be located on an external casing of the tool 32 in a manner accessible from outside.

Alternatively, the pneumatic port 42 could also be connected to a passive filter unit, like the Greentech filter unit available from RUPES S.p.A. This would be particularly interesting if the power tool 32 was adapted with an active dust extraction system, for example also operated by the motor of the power tool 32, which actively blows the dust-laden air from the working surface out into the environment through the pneumatic port 42. The active dust extraction system could be contained in the casing 40 preferably near an internal opening of the pneumatic port 42. If the passive filter unit was connected to the pneumatic port 42, the dust and small particles in the dust-laden air would be collected in the filter unit and would not pollute the surrounding air. The passive filter unit preferably comprises a socket for releasable connection to the pneumatic port 42.

It is suggested that the socket of the passive filter unit is attached to the pneumatic port 42 of the power tool 32 and secured thereto by means of magnetic force, which will be described in further detail hereinafter.

Figure 3:
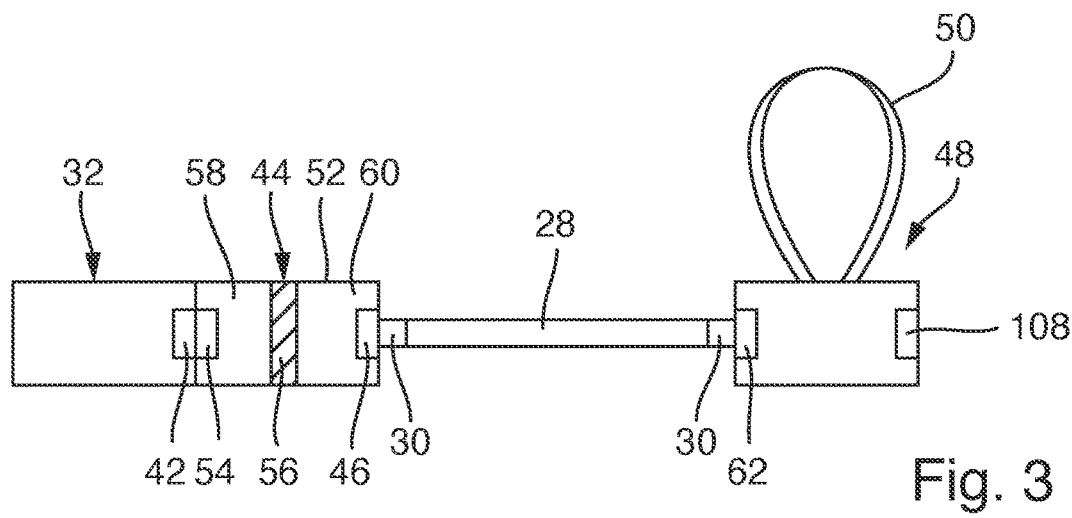
FIGS. 3 to 5 a vacuum generation unit embodied as a dust extraction system, in particular a mobile vacuum cleaner, in combination with a vacuum utilization device embodied as a hand-guided power tool, in particular a sanding machine, according to other embodiments.
Figure 4:
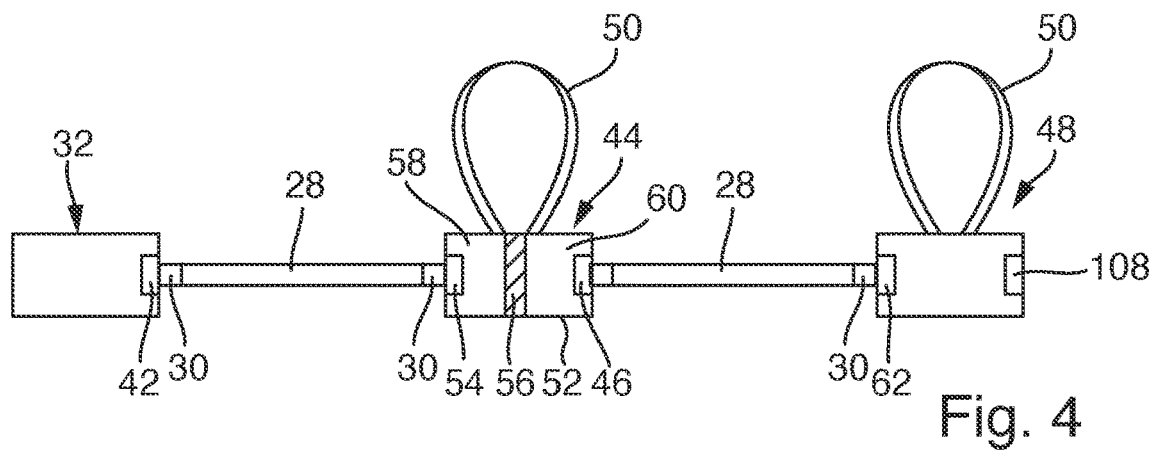
Figure 5:
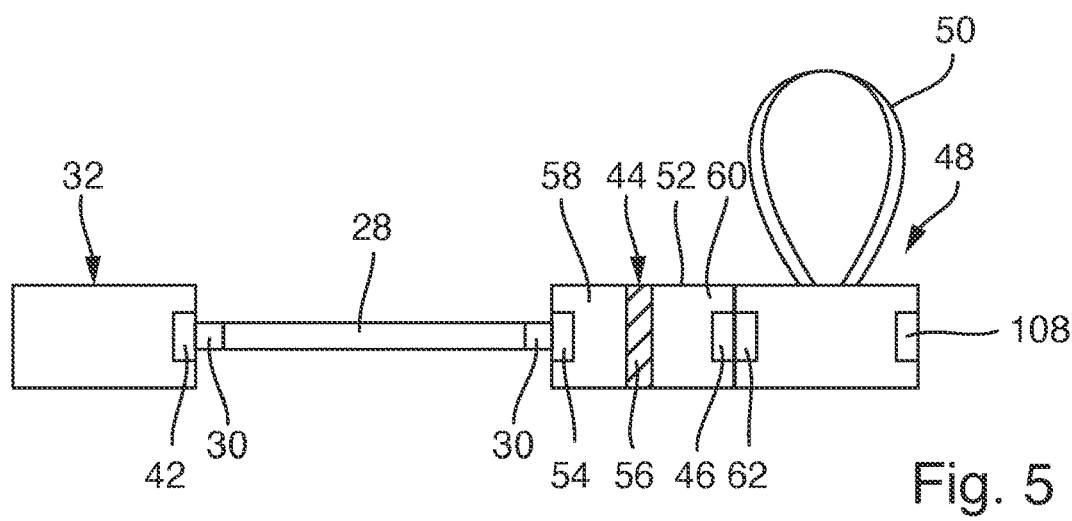

Various embodiments using a passive filter unit are shown in FIGS. 3 to 5 in a schematic view. The Figs. show the hand-guided power tool 32. The passive filter unit is designated with reference sign 44, and a vacuum generation device, for example comprising an electric motor and a turbine, which may be attached to an air outlet port 46 of the filter unit 44, is designated with reference sign 48. Pneumatic tubes or hoses for interconnecting the power tool 32, the passive filter unit 44 and, if present, the vacuum generation device 48 are designated with reference sign 28. Belts or straps, which may be present for releasably attaching one or more of the components 44, 48 to the body of a user (e.g. to his back, to his waist, over his shoulder) are designated with reference sign 50. Such embodiments of dust extraction systems are principally known from and described in further detail in EP-Application no. 19 211 438.7 to Dr. Guido Valentini, filed on Nov. 26, 2019. This application is incorporated herein by reference in its entirety.

The passive filter unit 44 comprises a casing 52 with an air inlet port 54 and the air outlet port 46. A filter element 56 is located in the casing 52 between the air inlet port 54 and the air outlet port 46, thereby separating the interior space of the casing 52 into an air inlet chamber 58 and an air outlet chamber 60. Dust-laden air from the power tool 32 passes through the casing 52 from the air inlet port 54 to the air outlet port 46. Dust and small particles are separated from the air flow by the filter element 56 and collected in the air inlet chamber 58. The efficiency of the passive filter unit 44 can be significantly increased if an active vacuum generation device 48 is pneumatically connected to the air outlet port 46, turning the entire system into an active dust extraction system. To this end, a vacuum is generated in the casing 52 by the vacuum generation device 48. Filtered air is discarded into the environment through an air outlet port 108 of the vacuum generation device 48.

In the embodiment of FIG. 3, the air inlet port 54 of the passive filter unit 44 is directly connected to the air outlet port 42 of the power tool 32. To this end, one of the air outlet port 42 and the air inlet port 54 is embodied as a pneumatic port according to the present invention, like the pneumatic port 42 described above. Accordingly, the other one of the air outlet port 42 and the air inlet port 54 is embodied as a socket according to the present invention, like the socket 30 of the pneumatic tube or hose 28 described above. The passive filter unit 44 can be attached to the power tool 32 in any desired manner. Preferably, the passive filter unit 44 is secured to the power tool 32 by means of magnetic force acting between magnetic elements provided in the passive filter unit 44 and the power tool 32, preferably near or at the air inlet port 54 and the air outlet port 42. The magnetic elements may comprise permanent magnets and/or ferromagnetic elements. One or more corresponding magnetic elements are provided in the passive filter unit 44 and the power tool 32. For example, one of them may be provided with permanent magnets. In that case, the other one of them could be provided with permanent magnets (of opposite polarity) and/or with ferromagnetic elements. Permanent magnets of opposing polarities or permanent magnets and ferromagnetic elements are attracted by means of magnetic force acting between them. The magnetic force provides for a safe and reliable securing of the passive filter unit 44 to the power tool 32 avoiding an unintentional separation and detachment of the filter unit 44 from the power tool 32, for example during the intended use of the power tool 32.

Further, in the embodiment of FIG. 3 the passive filter unit 44 is connected to the active vacuum generation device 48 by means of a pneumatic tube or hose 28. To this end, the tube or hose 28 has two sockets 30, one at each end. The air outlet port 46 of the filter unit 44 is preferably embodied as a pneumatic port according to the present invention, like the pneumatic port 42 described above. Similarly, an air inlet port 62 of the vacuum generation device 48 is also embodied as a pneumatic port according to the present invention. The pneumatic tube or hose 28 is attached to the passive filter unit 44 and the active vacuum generation device 48, respectively, in any desired manner. Preferably, the pneumatic tube or hose 28 is secured to the passive filter unit 44 and the active vacuum generation device 48, respectively, by means of magnetic force. Preferably, the sockets 30 of the pneumatic tube or hose 28 are secured to the pneumatic ports 46, 62 by means of magnetic force. To this end, magnetic elements are provided in the pneumatic tube or hose 28, preferably near or at the sockets 30, in the passive filter unit 44, preferably near or at the pneumatic port 46, and in the vacuum generation device 48, preferably near or at the pneumatic port 62. Everything which was said regarding the magnetic elements of the connection between the air outlet port 42 of the power tool 32 and the air inlet port 54 of the filter unit 44 also applies to the magnetic elements for the connection between the air outlet port 46 and a first socket 30 of the pneumatic tube or hose 28 and for the connection between the air inlet port 62 and the second socket 30 of the pneumatic tube or hose 28.

In the embodiment of FIG. 4, the air inlet port 54 of the passive filter unit 44 is indirectly connected to the air outlet port 42 of the power tool 32 by means of a pneumatic tube or hose 28. To this end, the air outlet port 42 and the air inlet port 54 are both embodied as pneumatic ports according to the present invention, like the pneumatic port 42 described above. Accordingly, the pneumatic tube or hose 28 has sockets 30 at both of its distal ends. The power tool 32 and the passive filter unit 44 can be attached to the pneumatic tube or hose 28 in any desired manner. Preferably, the power tool 32 and the passive filter unit 44 are secured to the pneumatic tube or hose 28 by means of magnetic force acting between magnetic elements provided in the power tool 32 and the passive filter unit 44, preferably near or at the pneumatic ports 42, 54, on the one hand and in the pneumatic tube or hose 28, preferably near or at the sockets 30, on the other hand. Everything which was said above regarding the magnetic elements also applies to the magnetic elements for the connection between the air outlet port 42 of the power tool 32 and a first socket 30 of the pneumatic tube or hose 28 and for the connection between the air inlet port 54 of the passive filter unit 44 and the second socket 30 of the pneumatic tube or hose 28.

Further, in the embodiment of FIG. 4 the passive filter unit 44 is connected to the active vacuum generation device 48 by means of a pneumatic tube or hose 28, like it is the case in the embodiment of FIG. 3, which was described in detail above.

In the embodiment of FIG. 5 the power tool 32 is connected to the passive filter unit 44 by means of a pneumatic tube or hose 28, like it is the case in the embodiment of FIG. 4, which was described in detail above. Further, the passive filter unit 44 is directly connected to the active vacuum generation device 48, similar to what was described in respect to the direct connection of the air outlet port 42 of the power tool 32 to the air inlet port 54 of the passive filter unit 44 of FIG. 3. To this end, one of the air outlet port 46 of the filter unit 44 and the air inlet port 62 of the vacuum generation device 48 is embodied as a pneumatic port according to the present invention, like the pneumatic port 42 described above. Accordingly, the other one of the air outlet port 46 and the air inlet port 62 is embodied as a socket according to the present invention, like the socket 30 of the pneumatic tube or hose 28 described above. The passive filter unit 44 can be attached to the vacuum generation device 48 in any desired manner. Preferably, the passive filter unit 44 is secured to the vacuum generation device 48 by means of magnetic force acting between magnetic elements provided in the passive filter unit 44 and the vacuum generation device 48, preferably near or at the air outlet port 46 and the air inlet port 62. Everything which was said above regarding the magnetic elements for the connection of the passive filter unit 44 to the power tool 32 also applies to the magnetic elements for the connection between the air outlet port 46 of the filter unit 44 and the air inlet port 62 of the vacuum generation device 48.

Figure 6:
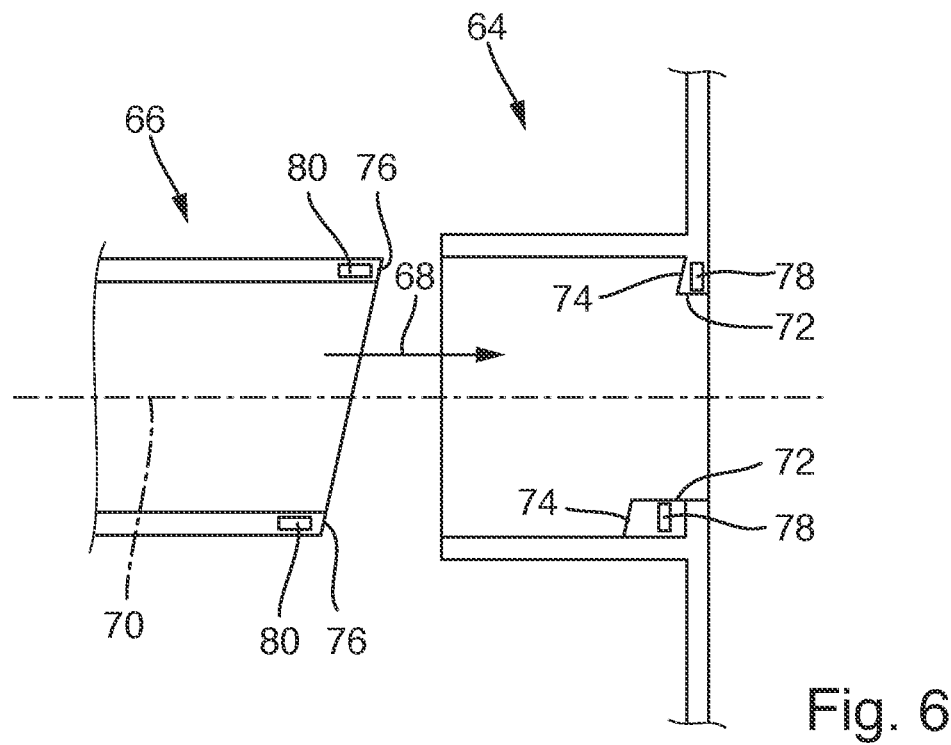
FIG. 6 a socket of a pneumatic tube or hose with a pneumatic port of a vacuum generation unit or a vacuum utilization device, according to another embodiment, in a position separated from each other.
Figure 7:
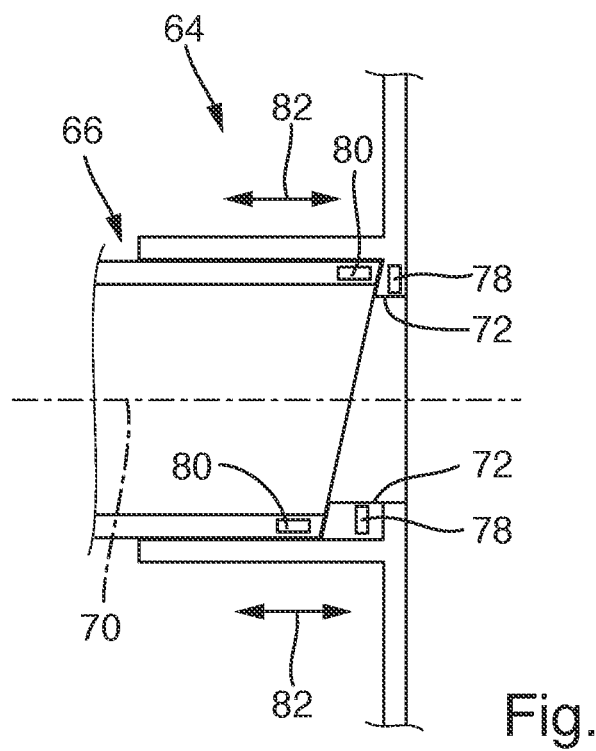
FIG. 7 the socket with the pneumatic port of FIG. 6, in a position connected to each other.
Figure 8:
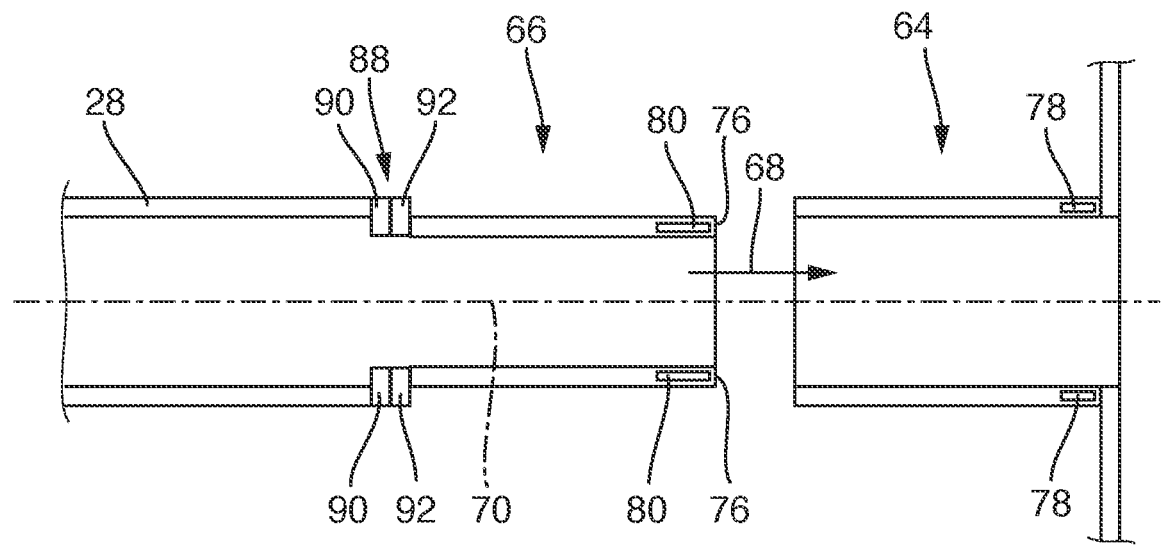
FIG. 8 a socket of a pneumatic tube or hose with a pneumatic port of a vacuum generation unit or a vacuum utilization device, according to yet another embodiment, in a position separated from each other.
Figure 9:
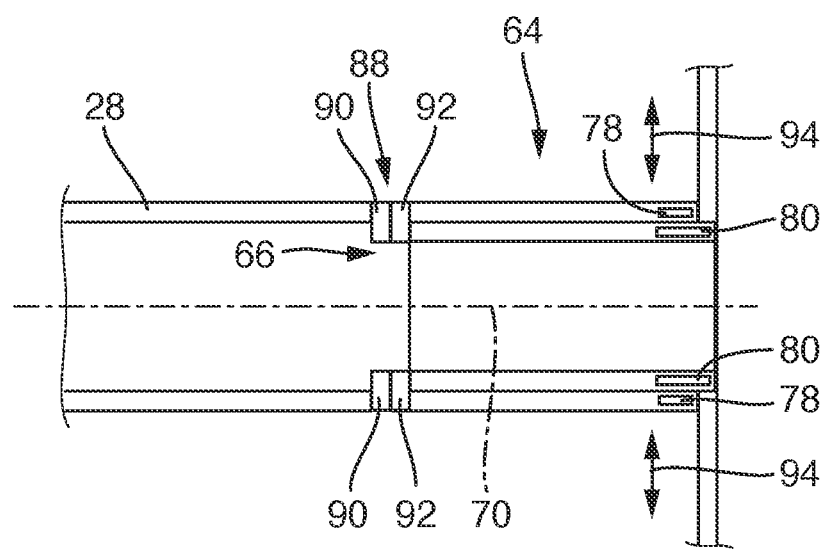
FIG. 9 the socket with the pneumatic port of FIG. 8, in a position connected to each other.
Figure 10:
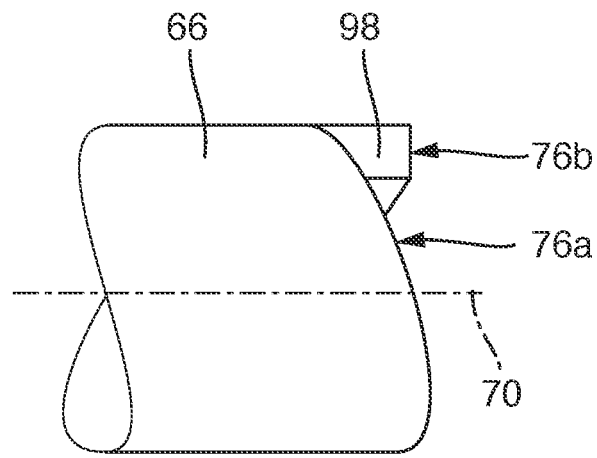
FIG. 10 a socket of a pneumatic tube or hose with a specifically designed end surface facing a pneumatic port of a vacuum generation unit or of a vacuum utilization device when the socket is secured to the pneumatic port.
Figure 11:
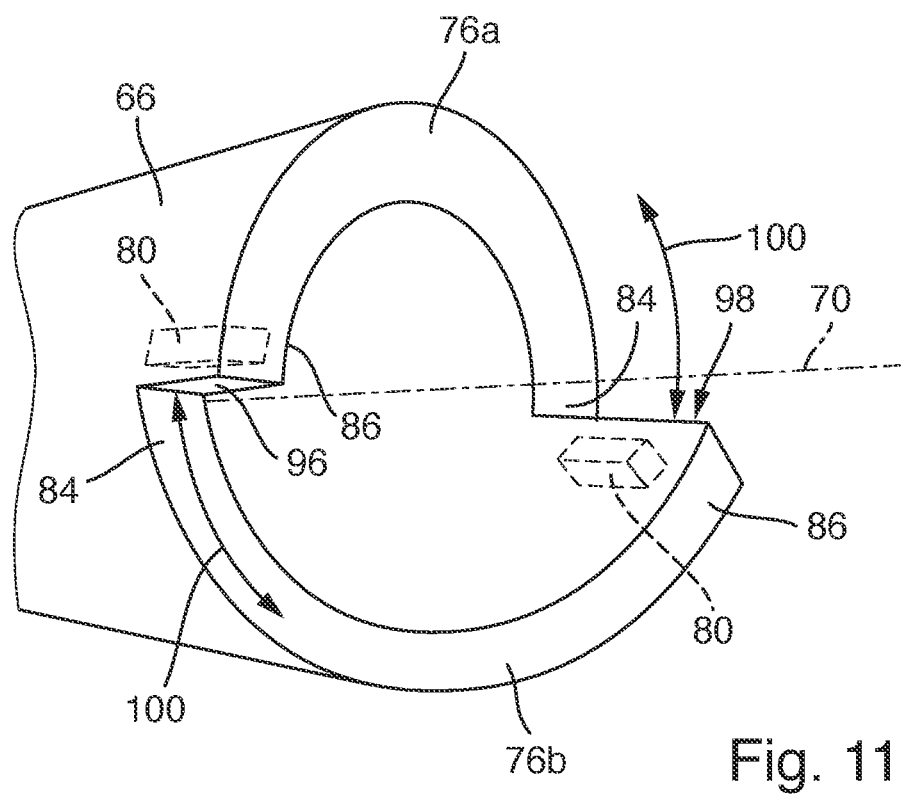
FIG. 11 a detailed view on the end surface of the socket of FIG. 10.

The magnetic force established by the magnetic field between the magnetic elements may be directed in any direction, including an axial direction (see FIGS. 6 and 7), a radial direction (see FIGS. 8 and 9) and a circumferential direction (see FIGS. 10 and 11). In the examples of FIGS. 6 to 9 a pneumatic port 64 is shown which may be, for example, an air inlet port 26 of a vacuum cleaner 2, an air outlet port 42 of a power tool 32, an air inlet port 54 of a passive filter unit 44, an air outlet port 46 of a passive filter unit 44, an air inlet port 62 of a vacuum generation device 48 or the like. Further, FIGS. 6 to 9 show a socket 66 which may be, for example, a socket 30 of a pneumatic tube or hose 28, an air outlet port 42 of a power tool 32, an air inlet port 54 of a passive filter unit 44, an air outlet port 46 of a passive filter unit 44, an air inlet port 62 of a vacuum generation device 48 or the like. FIGS. 6 and 8 show the pneumatic port 64 and the socket 66 in a position separated from each other. In FIGS. 7 and 9 the pneumatic port 64 and the socket 66 are attached and magnetically secured to each other.

In FIGS. 6 and 7 the socket 66 is designed and formed such that it may be inserted into the pneumatic port 64. Both elements 64, 66 have a tube-like shape, preferably with a circular cross section perpendicular to a longitudinal axis 70 of the pneumatic port 64 and of a pneumatic tube or hose 28, respectively, to which the socket 66 is attached. The external diameter of the socket 66 is slightly smaller than the internal diameter of the pneumatic port 64, in order to allow insertion of the socket 66 into the pneumatic port 64. Of course, many other designs and forms of the pneumatic port 64 and the socket 66 are contemplated, too. In particular, the pneumatic port 64 could have an external diameter slightly smaller than an internal diameter of the socket 66, in order to allow insertion of the pneumatic port 64 into the socket 30.

The insertion direction is indicated with reference sign 68 and extends essentially parallel to the longitudinal axis 70. The pneumatic port 64 has an annular protrusion 72 extending radially inwards from an internal surface of the tube-shaped pneumatic port 64 and having an abutment surface 74 facing an end surface 76 of the socket 66. Preferably, the abutment surface 74 of the pneumatic port 64 and the end surface 76 of the socket 66 are annularly shaped. Of course, for example the annular protrusion 72 could also consist of a plurality of discrete protrusions each extending radially inwards and spaced apart from each other in a circumferential direction. Further, if the pneumatic port 64 is inserted in the socket 66, then the annular protrusion would extend radially outwards from an external surface of the tube-shaped pneumatic port 64.

Respective magnetic elements 78, 80 are provided at the abutment surface 74 of the pneumatic port 64 and the end surface 76 of the socket 66. The magnetic elements 78, 80 are selected and located in respect to each other in order to interact with each other and to generate a magnetic field which establish by the magnetic force used for securing the socket 66 to the pneumatic port 64 when the socket 66 and the pneumatic port 64 are attached to each other. In a position in which the socket 66 is attached to the pneumatic port 64 (see FIG. 7), the magnetic elements 78, 80 are located next to each other in an axial direction. Hence, the magnetic force 82 between the magnetic elements 78, 80 acts in an axial direction, i.e. parallel to the longitudinal axis 70 of the pneumatic port 64 and of a pneumatic tube or hose 28, respectively, to which the socket 66 is attached.

For example, the one or more magnetic elements 78 of the pneumatic port 64 are embodied as permanent magnets. In that case, the one or more magnetic elements 80 of the socket 66 could be embodied as permanent magnets having an opposite polarity than the permanent magnets 78 or they could be embodied as ferromagnetic elements. Of course, it would also be possible that a plurality of magnetic elements 78 of the pneumatic port 64 are embodied in an alternating manner along the circumference as permanent magnets and as ferromagnetic elements. In that case, the plurality of magnetic element 80 of the socket 66 could also be embodied in an alternating manner along the circumference as corresponding permanent magnets and ferromagnetic elements. The magnetic elements 78, 80 may each comprise a single magnetic element having an annular form extending along the entire circumference of the pneumatic port 64 and the socket 66. Alternatively, the magnetic elements 78, 80 may each comprise a plurality of separate magnetic elements each of which extending along only part of the circumference of the pneumatic port 64 and the socket 66. The separate magnetic elements 78, 80 may have an arch-shaped or straight extension or have a cylindrical form.

The magnetic elements 78, 80 may be inserted into the pneumatic port 64 and the socket 66 during their manufacturing, e.g. by means of a co-moulding process. Alternatively, depressions may be provided in the pneumatic port 64 and the socket 66 into which the magnetic elements 78, 80 are inserted and secured after manufacturing of the pneumatic port 64 and the socket 66. The depressions may be provided during manufacturing of the pneumatic port 64 and the socket 66, e.g. during a moulding process, or they may be introduced in a separate step after manufacturing of the pneumatic port 64 and the socket 66. The magnetic elements 78, 80 may be secured in the depressions, for example, by frictional force, by means of an adhesive, by bonding or the like. After insertion of the magnetic elements 78, 80 into the depressions, the depressions could be covered, closed and/or sealed by means of cover elements. The cover elements could also serve for securing the magnetic elements 78, 80 in the depressions.

If can be seen from FIGS. 6 and 7 that the socket 66 of the pneumatic tube or hose 28 comprising the at least one magnetic element 80 has an end surface 76 facing the pneumatic port 64 when the socket 66 is secured to the pneumatic port 64. The end surface 76 has a ramp shape which is shown in more detail in FIGS. 10 and 11. The ramp-shaped end surface 76 rises continuously from a starting region 84 of the end surface 76 along its circumference to an end region 86 of the end surface 76.

An imaginary plane extending perpendicular in respect to the longitudinal axis 70 of the socket 66 or the pneumatic tube or hose 28, respectively, is defined. The end surface of a conventional socket of a pneumatic tube or hose will extend in this plane. In contrast thereto, the end surface 76 of the socket 66 of the pneumatic tube or hose 28 according to this embodiment, only the starting region 84 or the end region 86 is located in that plane while the rest of the end surface 76 continuously moves away (rises or drops away) from the plane and has its largest distance to the plane at its end region 86 (with the starting region 84 extending in the plane) or its starting region 84 (with the end region 86 extending in the plane), respectively.

In one embodiment, the ramp shaped end surface 76 may extend along the entire circumference of 360°. In the embodiment shown in FIGS. 10 and 11, the end surface 76 of the socket 66 of the pneumatic tube or hose 28 comprising the at least one magnetic element 80 (in this embodiment the two magnetic elements 80) has two ramp-shaped regions 76a, 76b each of which continuously rise from a starting region 84 of the ramp-shaped regions 76a, 76b along the circumference to an end region 86. In this case, each of the ramp-shaped regions 76a, 76b of the end surface 76 extends along a circumference of 180°. Of course, the end surface 76 may also comprise more than two ramp-shaped regions 76a, 76b, for example, three ramp-shaped regions each extending along a circumference of 120°, four ramp-shaped regions each extending along a circumference of 90° and so on.

It can be further seen in FIGS. 6 and 7 that the pneumatic port 64 has a correspondingly designed ramp-shaped end surface 74 so when the pneumatic port 64 and the socket 66 are attached and secured to each other the end surfaces 74, 76 rest on each other along their entire surfaces. The above description of the end surface 76 of the socket 66 also applies to the end surface 74 of the pneumatic port 64. In order to avoid repetitions regarding the end surface 76, reference is made to the above description of the end surface 74.

In the magnetically secured position of the socket 66 in respect to the pneumatic port 64, the two mating end surfaces 74, 76 of the socket 66 and the pneumatic port 64 preferably rest on each other along the entire surfaces. By rotating the socket 66 about the longitudinal axis 70 in respect to the pneumatic port 64 in a counter-clockwise direction, the mating end surfaces 74, 76 slide on each other thereby increasing the distance between the magnetic elements 78, 80 provided at the pneumatic port 64 and the socket 66. Due to the increasing distance of the respective magnetic elements 78, 80 the magnetic force interacting between them decreases, thereby facilitating release of the connection between the socket 66 and the pneumatic port 64. Hence, by rotating the socket 66 about the longitudinal axis 70 in respect to the pneumatic port 74, a force directed in the opposite direction of the magnetic force, which has to be applied to the socket 66 in order to release the connection is significantly reduced. When attaching the socket 66 to the pneumatic port 64, a relative rotation of the socket 66 in respect to the pneumatic port 64 in the opposite direction, i.e. clockwise, is applied. Of course, other mechanical means acting between the socket 66 and the pneumatic element 64, e.g. a lever mechanism or the like, may be applied in order to initially distance the magnetic elements 80 of the socket 66 from the magnetic elements 78 of the pneumatic port 64 and to facilitate release of the connection between the socket 66 and the pneumatic port 64.

FIGS. 8 and 9 show another embodiment of the present invention. In this embodiment corresponding components have been assigned the same reference signs as in the previous embodiment of FIGS. 6 and 7. It can be seen that the socket 66 is attached to an end of a pneumatic tube or hose 28 as if it was an extension of the tube or hose 28. The pneumatic tube or hose 28 is connected to the pneumatic port 64 of the vacuum generation unit and/or to the vacuum utilization device in a manner freely rotatable about the longitudinal axis 70. In this embodiment, this is achieved by the socket 66 being attached to the end of the pneumatic tube or hose 28 by means of a rotary connection element 88 providing for a free rotation of the pneumatic tube or hose 28 in respect to the socket 66 about the longitudinal axis 70. The rotary connection element 88 provides for an airtight connection of the socket 66 to the end of the pneumatic tube or hose 28. Preferably, the rotary connection element 88 has an annular, circular shape, in order to allow free rotation of the pneumatic tube or hose 28 in respect to the socket 66. The free rotation is independent of the cross sectional form of the socket 66 and the pneumatic tube or hose 28 and can be realized by means of the rotary connection element 88 even if the socket 66 and/or the pneumatic tube or hose 28 do not have a circular cross sectional form. Preferably, the rotary connection element 88 has two separate annular members 90, 92 and frictional bearing surfaces or a ball bearing between the two annular members 90, 92 for easier rotation.

In the embodiment of FIGS. 8 and 9, the end surface 76 of the socket 66 lies in the imaginary plane extending perpendicular to the longitudinal axis 70. The pneumatic port 64 and the socket 66 do not have mating ramp-shaped end surfaces 74, 76. However, it would also be possible to provide this embodiment with ramp-shaped end surfaces 74, 76.

In a position in which the socket 66 is attached to the pneumatic port 64 (see FIG. 9), the magnetic elements 78, 80 of the pneumatic port 64 and the socket 66 are located next to each other in a radial direction. Hence, a magnetic force 94, which is used for securing the socket 66 to the pneumatic port 64, acts in a radial direction, i.e. oblique, preferably perpendicular to the longitudinal axis 70 of the pneumatic port 64 and of a pneumatic tube or hose 28, respectively, to which the socket 66 is attached.

FIGS. 10 and 11 show another embodiment of the present invention. In this embodiment corresponding components have been assigned the same reference signs as in the previous embodiments. The magnetic elements 80 are located at axial abutment surfaces 96, 98 extending essentially parallel to the longitudinal axis 70 and interconnecting the starting region 84 of one ramp-shaped region 76b, 76a with the end region 86 of a neighbouring ramp-shaped region 76a, 76b. Although not shown, the end surface 74 of the pneumatic port 64 has a corresponding ramp-shaped design with two ramp-shaped surface regions and corresponding axial abutment surfaces. Respective magnetic elements 78 will be located at the axial abutment surfaces of the pneumatic port 64. In a position in which the socket 66 is attached to the pneumatic port 64, the magnetic elements 78, 80 of the pneumatic port 64 and the socket 66 will be located next to each other in a circumferential direction. Hence, a magnetic force 100, which is used for securing the socket 66 to the pneumatic port 64, acts in a circumferential direction about the longitudinal axis 70 of the pneumatic port 64 and of a pneumatic tube or hose 28, respectively, to which the socket 66 is attached.

Figure 12:
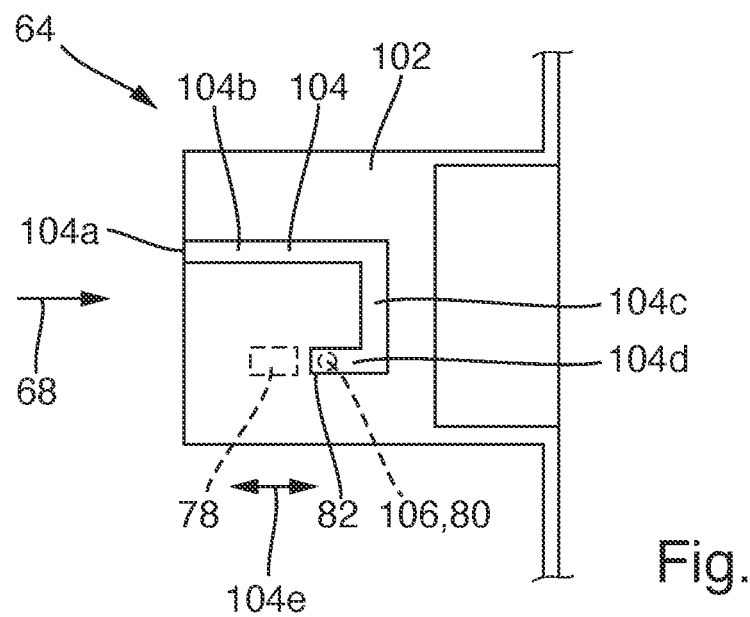
FIG. 12 a view on an external circumferential surface of a pneumatic port of a vacuum generation unit or of a vacuum utilization device according to another embodiment, partially in a sectional view.
Figure 13:
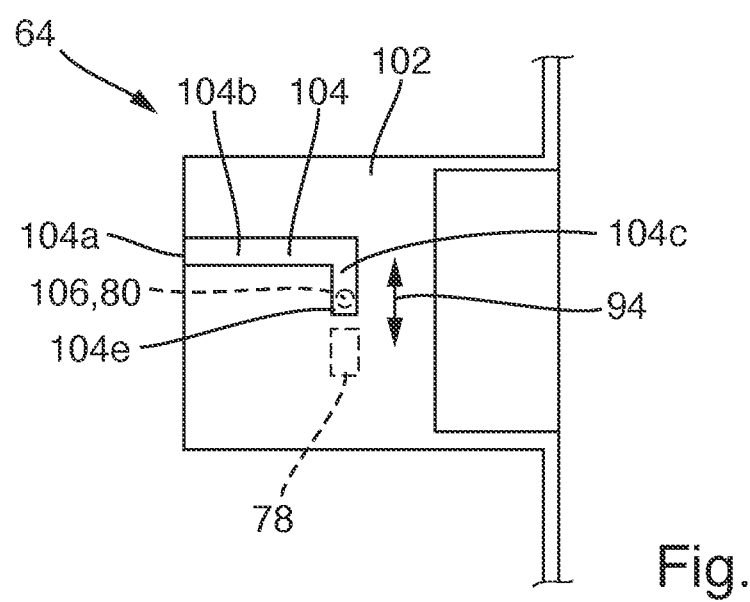
FIG. 13 a view on an external circumferential surface of a pneumatic port of a vacuum generation unit or of a vacuum utilization device according to yet another embodiment, partially in a sectional view.

Further embodiments of the present invention are shown in FIGS. 12 and 13. Corresponding components have been assigned the same reference signs as in the previous embodiments. In these embodiments the attachment of the socket 66 to the pneumatic port 64 is not achieved exclusively by a linear insertion motion in the direction 68. Rather, an external circumferential surface 102 of the pneumatic port 64 is provided with at least one guiding groove 104, in which during attachment of the socket 66 to the pneumatic port 64 a respective protrusion 106 of the socket 66 is guided into an end position, where the protrusion 106 is held by means of magnetic force, thereby securing the socket 66 to the pneumatic port 64.

In the embodiment of FIG. 12, the guiding groove 104 comprises an insertion opening 104a opening into a first axial region 104b, which at an end opposite to the insertion opening 104a opens into a circumferential region 104c, which at an end opposite to the first axial region 104b opens into a second axial region 104d with an end portion 104e opposite to the circumferential region 104c. Preferably, the first and second axial regions 104b and 104d extend parallel to the longitudinal axis 70 and parallel to each other. One or more magnetic elements 78 are located next to the end portion 104e. The protrusion 106 of the socket 66 comprises or is made of the one or more magnetic elements 80 of the socket 66. A magnetic force 82 acting between the magnetic elements 78, 80 is directed in an axial direction and, hence, pulls the protrusion 106 towards an end surface of the end portion 104e. In this way, the socket 66 is secured to the pneumatic port 64 by means of the magnetic force 82.

In the embodiment of FIG. 13, the guiding groove 104 comprises an insertion opening 104a opening into an axial region 104b, which at an end opposite to the insertion opening 104a opens into a circumferential region 104c with an end portion 104e opposite to the axial region 104b. Preferably, the axial region 104b extends parallel to the longitudinal axis 70. One or more magnetic elements 78 are located next to the end portion 104e. The protrusion 106 of the socket 66 comprises or is made of the one or more magnetic elements 80 of the socket 66. A magnetic force 94 acting between the magnetic elements 78, 80 is directed in a circumferential direction and, hence, pulls the protrusion 106 towards an end surface of the end portion 104e. In this way, the socket 66 is secured to the pneumatic port 64 by means of the magnetic force 94.

Of course, the guiding grooves 104 may have a design different from what is shown in FIGS. 12 and 13. For example, if the socket 66 was a male socket instead of the female socket and if the pneumatic port 64 was a female socket instead of the male socket, the guiding grooves 104 would have to be design differently in order to assure proper functioning of the connection. Furthermore, it would also be possible that the guiding grooves are provided on a circumferential surface, preferably on the internal circumferential surface, of the socket 66, whereby the pneumatic port 64 then would comprise one or more protrusions, preferably on the external circumferential surface 102.

The invention claimed is:

1. Pneumatic tube or hose (28) having a longitudinal axis (70) along a longitudinal extension of the pneumatic tube or hose (28) and having two ends each provided with a respective socket (66) adapted for a releasable airtight connection to a pneumatic port (64) of a vacuum unit or device (2, 32, 34), including either a vacuum generation unit (2) or a vacuum utilization device (32; 44), at least one socket (66) of the pneumatic tube or hose (28) comprises at least one magnetic element (80) adapted for interaction with at least one corresponding magnetic element (78) provided in the pneumatic port (64) in order to secure the at least one socket (66) of the pneumatic tube or hose (28) to the pneumatic port (64) by means of a magnetic force (100), the at least one socket (66) having a ramp shaped circumferential end surface (76) with the at least one magnetic element (80) provided therein and facing the pneumatic port (64) when the at least one socket (66) is secured to the pneumatic port (64), the ramp shaped circumferential end surface (76) extending around the longitudinal axis (70) of the pneumatic tube or hose (28) and adapted for interaction with a corresponding ramp shaped circumferential end surface (74) of the pneumatic port (64) having the at least one corresponding magnetic element (78) provided therein, having a starting region (84) with an end surface (96, 98), and an end region (86) with a corresponding end surface (96, 98), each end surface (96, 98) facing in a circumferential direction with respect to the longitudinal axis (70) of the pneumatic tube or hose (28), at least one end surface (96, 98) of the end surface (96, 98) and the corresponding end surface (96, 98) having the at least one magnetic element (80) dispose therein, and having a ramp shape continuously rising from the starting region (84) to the end region (86), winding around the longitudinal axis (70) and extending in a direction parallel to and along the longitudinal axis (70) of the pneumatic tube or hose (28), the ramp shaped circumferential end surface (76) and the corresponding ramp shaped circumferential end surface (74) allowing the at least one magnetic element (80) to interact with the at least one corresponding magnetic element (78) so that rotation of the at least one socket (66) in respect to the pneumatic port (64) about the longitudinal axis (70) of the pneumatic tube or hose (28) will increase a combined circumferential and axial distance and reduce the magnetic force (100) acting between the at least one magnetic element (80) and the at least one corresponding magnetic element (78), so as to facilitate release of the releasable airtight connection between the at least one socket (66) and the at least one pneumatic port (64), wherein the at least one magnetic element (80) assigned to the at least one socket (66) of the pneumatic tube or hose (28) and the at least one corresponding magnetic element (78) assigned to the pneumatic port (64) are arranged with respect to the ramp shaped circumferential end surface (76) and the corresponding ramp shaped circumferential end surface (74) so that the magnetic force (100) acts along the ramp shaped circumferential end surface (76) and the corresponding ramp shaped circumferential end surface (74) and around the longitudinal axis (70) of the pneumatic tube or hose (28).

2. Pneumatic tube or hose (28) according to claim 1, wherein the at least one magnetic element (80) of the at least one socket (66) of the pneumatic tube or hose (28) comprises at least one of a permanent magnet and a ferromagnetic element.

3. Pneumatic tube or hose (28) according to claim 2, wherein the pneumatic tube or hose (28) is a flexible suction hose.

4. Pneumatic tube or hose (28) according to claim 1, wherein the pneumatic tube or hose (28) is rotatably connected to the vacuum unit or device (2, 32, 34) about the longitudinal axis (70) of the pneumatic tube or hose (28).

5. Pneumatic tube or hose (28) according to claim 4, wherein the at least one socket (66) of the pneumatic tube or hose (28) comprising the at least one magnetic element (80)

is attached to the vacuum unit or device (2, 32, 34) by a rotary connection element (88) so that the pneumatic tube or hose (28) can rotate with respect to the at least one socket (66) about the longitudinal axis (70) of the pneumatic tube or hose (28).

6. Pneumatic tube or hose (28) according to claim 1, wherein the pneumatic tube or hose (28) is a flexible suction hose.

7. Pneumatic tube or hose (28) according to claim 1, wherein
the pneumatic tube or hose (28) is adapted for the releasable airtight connection to the pneumatic port (64) of the vacuum generation unit (2) embodied as a dust extraction system, including a mobile vacuum cleaner, or
the pneumatic tube or hose (28) is adapted for the releasable airtight connection to a second pneumatic port (42; 64) of the vacuum utilization device (32; 44) embodied as a hand-guided power tool, including a sanding machine or a polishing machine.

8. Pneumatic tube or hose (28) according to claim 1, wherein each of the end surface (96, 98) and the corresponding end surface (96, 98) of the at least one socket (66) includes at least one respective magnetic element (80) disposed therein.

9. Pneumatic port (64) of a vacuum unit or device (2, 32, 34), including a generation unit (2) or a vacuum utilization device (32; 44), the pneumatic port (64) being adapted for a releasable airtight connection to a socket (66) provided at one end of a pneumatic tube or hose (28) having a longitudinal axis (70) along a longitudinal extension of the pneumatic tube or hose (28),
the pneumatic port (64) comprises at least one magnetic element (78) adapted for interaction with at least one corresponding magnetic element (80) provided at the socket (66) of the pneumatic tube or hose (28), in order to secure the socket (66) to the pneumatic port (64) by means of a magnetic force (100),
the pneumatic port (64) having a ramp shaped end circumferential surface (74) with the at least one magnetic element (78) provided therein and facing the socket (66) of the pneumatic tube or hose (28) when the socket (66) is secured to the pneumatic port (64),
the ramp shaped circumferential end surface (74) extending around the longitudinal axis (70) of the pneumatic tube or hose (28) and adapted for interaction with a corresponding ramp shaped circumferential end surface (76) of the socket (66) having the at least one corresponding magnetic element (80) provided therein, having a starting region an end surface and an end region with a corresponding end surface, the starting region and the end region corresponding to a corresponding starting region (84) and a corresponding end region (86) of the socket (66) of the pneumatic tube or hose (28), each end surface facing in a circumferential direction with respect to the longitudinal axis (70) of the pneumatic tube or hose (28), at least one end surface having the at least one magnetic element (78) disposed therein, and having a ramp shape continuously rising from the starting region to the end region, winding around the longitudinal axis (70) of the pneumatic tube or hose (28) and extending in a direction parallel to and along the longitudinal axis (70),
the ramp shaped circumferential end surface (74) and the corresponding ramp shaped circumferential end surface (76) allowing the at least one magnetic element (78) to interact with the at least one corresponding magnetic element (80) so that rotation of the socket (66) in respect to the pneumatic port (64) about the longitudinal axis (70) of the pneumatic tube or hose (28) will increase a combined circumferential and axial distance and reduce the magnetic force (82; 94; 100) acting between the at least one magnetic element (78) and the at least one corresponding magnetic element (80), so as to facilitate release of the releasable airtight connection between the socket (66) and the pneumatic port (64),
wherein the at least one magnetic element (78) assigned to the pneumatic port (64) and the at least one corresponding magnetic element (80) assigned to the socket (66) of the pneumatic tube or hose (28) are arranged with respect to the ramp shaped circumferential end surface (74) and the corresponding ramp shaped circumferential end surface (76) so that the magnetic force (100) acts along the ramp shaped circumferential end surface (74) and the corresponding ramp shaped circumferential end surface (76) and around the longitudinal axis (70) of the pneumatic tube or hose (28).

10. Pneumatic port (64) according to claim 9, wherein the at least one magnetic element (78) of the pneumatic port (64) comprises at least one of a permanent magnet and a ferromagnetic element.

11. Pneumatic port (64) according to claim 9, wherein the pneumatic port (26; 54) is configured as:
an air inlet port (26) of a vacuum cleaner (2);
an air outlet port (42) of a power tool (32);
an air inlet port (54) of a passive filter unit (44);
an air outlet port (46) of the passive filter unit (44) or
an air inlet port (62) of a vacuum generation device (48).

12. Pneumatic port (64) according to claim 9, wherein each of the end surface and the corresponding end surface of the pneumatic port (64) includes at least one respective magnetic element (78) disposed therein.

13. Hand-guided power tool (32), including a sanding machine or a polishing machine, comprising:
a working element (38), including with a sanding or polishing member, the hand-held power tool (32) being adapted for working a working surface with the working element (38) when using the hand-guided power tool (32), and the hand-guided power tool (32) creating dust when used,
a pneumatic port (64) having a longitudinal extension, in the form of an air outlet port (42) adapted for releasable connection to a socket (66) provided at an end of a pneumatic tube or hose (28) of a vacuum generation unit (2; 48), including a dust extraction system,
the socket (66) having a ramp shaped circumferential end surface (76) with at least one magnetic element (80) provided therein and facing the pneumatic port (64) when the at least one socket (66) is secured to the pneumatic port (64), and having a starting region (84) with an end surface (96, 98) and an end region (86) with a corresponding end surface (96, 98), each end surface (96, 98) facing in a circumferential direction with respect to a longitudinal axis (70) of the pneumatic tube or hose (28), at least one end surface (96, 98) having the at least one magnetic element (80) disposed therein, and having a ramp shape continuously rising from the starting region (84) to the end region (86), winding around the longitudinal axis (70) of the pneumatic tube or hose (28) and extending in a direction parallel to and along the longitudinal axis (70),
the pneumatic port (64) having at least one corresponding magnetic element (78) and being adapted for releasable connection to the socket (66) of the pneumatic tube or hose (28) by means of magnetic force (100), the at least one corresponding magnetic element (78) of the pneumatic port (64) being adapted for interaction with the at least one magnetic element (80) of the socket (66) in order to secure the socket (66) of the pneumatic tube or hose (28) to the pneumatic port (64) of the hand-guided power tool (32) by means of the magnetic force (100), the pneumatic port (64) having a corresponding ramp shaped circumferential end surface (74) with the at least one corresponding magnetic element (78) provided therein and facing the socket (66) of the pneumatic tube or hose (28) when the socket (66) is secured to the pneumatic port (64), the corresponding ramp shaped circumferential end surface (74) extending around a longitudinal axis (70) of the pneumatic tube or hose (28) when the socket (66) is secured to the pneumatic port (64) and adapted for interaction with the ramp shaped circumferential end surface (76) of the pneumatic tube or hose (28), having a corresponding starting region with an associated end surface and a corresponding end region with a corresponding associated end surface, the corresponding starting region and the corresponding end region corresponding to starting region (84) and the end region (86) of the socket (66) of the pneumatic tube or hose (28), each associated end surface facing in the circumferential direction with respect to the longitudinal axis (70) of the pneumatic tube or hose (28), at least one associated end surface having the at least one corresponding magnetic element (78) disposed therein, and having a corresponding ramp shape continuously rising from the corresponding starting region to the corresponding associated end region, winding around the longitudinal axis (70) and extending in the direction parallel to and along the longitudinal axis (70) of the pneumatic tube or hose (28) when the socket (66) is secured to the pneumatic port (64), the corresponding ramp shaped circumferential end surface (74) and the ramp shaped circumferential end surface (76) allowing the at least one corresponding magnetic element (78) to interact with the at least one other magnetic element (80) so that rotation of the socket (66) in respect to the pneumatic port (64) about the longitudinal axis (70) of the pneumatic tube or hose (28) will increase a combined circumferential and axial distance between the ramp shaped circumferential end surface (76) of the socket (66) and the corresponding ramp shaped circumferential end surface (74) of the pneumatic port (64) and reduce the magnetic force (100) acting between the at least one corresponding magnetic element (78) and the at least one other magnetic element (80), so as to facilitate release of the releasable airtight connection between the socket (66) and the pneumatic port (64), wherein the at least one magnetic element (80) assigned to the socket (66) of the pneumatic tube or hose (28) and the at least one corresponding magnetic element (78) assigned to the pneumatic port (64) are arranged with respect to the corresponding ramp shaped circumferential end surface (74) and the ramp shaped circumferential end surface (76) so that the magnetic force (100) acts along the ramp shaped circumferential end surface (76) and the corresponding ramp shaped circumferential end surface (74) and around the longitudinal axis (70) of the pneumatic tube or hose (28).

14. Hand-guided power tool (32) according to claim 13, wherein each of the end surface (96, 98) and the corresponding end surface (96, 98) of the socket (66) includes at least one respective magnetic element (80) disposed therein; and each of the associated end surface and the corresponding associated end surface includes at least one respective corresponding magnetic element (78) disposed therein.

* * * * *